| United States Patent [19] | [11] Patent Number: 4,835,216 |
| Morikawa et al. | [45] Date of Patent: May 30, 1989 |

[54] CONJUGATED DIENE SERIES RUBBER COMPOSITIONS

[75] Inventors: Akihiko Morikawa, Tsu; Fumio Tsutsumi; Mitsuhiko Sakakibara, both of Yokkaichi; Noboru Oshima, Suzuka; Tatsuro Hamada, Higashimurayama; Hiromi Fukuoka; Hideki Komatsu, both of Kodaira; Tatsuo Fujimaki, Higashimurayama, all of Japan

[73] Assignee: Bridgestone Corporation, Tokyo, Japan

[21] Appl. No.: 100,054

[22] Filed: Sep. 23, 1987

[30] Foreign Application Priority Data

Nov. 7, 1986 [JP] Japan ................................. 61-265071

[51] Int. Cl.$^4$ .......................... C08L 53/02; C08L 9/06; C08F 271/00; C08F 293/00
[52] U.S. Cl. .......................................... 525/77; 525/98; 525/293; 525/294; 525/288
[58] Field of Search .................... 525/77, 98, 293, 294, 525/288

[56] References Cited

U.S. PATENT DOCUMENTS

| 4,091,053 | 5/1978 | Kitchen | 525/98 |
| 4,550,142 | 10/1985 | Akita et al. | |
| 4,555,547 | 11/1985 | Ueda et al. | 525/237 |
| 4,555,548 | 11/1985 | Ueda et al. | 525/237 |
| 4,614,771 | 9/1986 | Watanabe et al. | |
| 4,616,069 | 10/1986 | Natanabel et al. | 525/370 |

FOREIGN PATENT DOCUMENTS

| 154742 | 9/1983 | Japan . |
| 58-154742 | 9/1983 | Japan . |
| 61-78850 | 4/1986 | Japan . |
| 61-296001 | 12/1986 | Japan . |

*Primary Examiner*—Lewis T. Jacobs
*Assistant Examiner*—Susan Berman
*Attorney, Agent, or Firm*—Sughrue, Mion, Zinn, Macpeak, and Seas

[57] ABSTRACT

A conjugated diene series rubber composition comprises, as a rubber component, (a) 20~100% by weight of a particular conjugated diene polymer and (b) a diene polymer rubber except for the polymer (a) and is excellent in the processability at unvulcanized state and the rebound resilience, strengths at rupture and wear resistance at vulcanized state.

8 Claims, No Drawings

CONJUGATED DIENE SERIES RUBBER COMPOSITIONS

BACKGROUND OF THE INVENTION

1. Field of the Invention

This invention relates to a conjugated diene series rubber composition having an excellent processability at unvulcanized state and excellent rebound resilience, strengths at rupture, particularly high-temperature strength and wear resistance at vulcanized state.

2. Related Art Statement

Recently, the demand on low fuel consumption and safety in automobiles becomes increasingly large. In this connection, the conventional diene series rubber materials can not simultaneously satisfy the low fuel consumption and the safety. Therefore, conjugated diene polymers having excellent rebound resilience and strength at rupture become requested as a rubber material for tires, particularly tire tread and so on.

Heretofore, the conjugated diene polymers having an excellent rebound resilience have been produced by polymerizing butadiene in a hydrocarbon solvent with an organolithium initiator, or by copolymerizing butadiene with an aromatic vinyl compound such as styrene or the like and then reacting with a tin halide or an alkenyltin compound as disclosed in Japanese Patent Application Publication No. 44-4,996, Japanese Patent laid open No. 57-205,414, U.S. Pat. No. 3,956,232 and the like.

In these polymers, however, the strengths at rupture, particularly high-temperature strength are poor, so that severer conditions required in tire tread can not be satisfied.

On the other hand, there are natural rubber, synthetic polyisoprene rubber and so on as a rubber material having excellent strengths at rupture, which are widely used or tire tread in truck and bus under a high loading condition at the present. However, these rubbers are poor in the rebound resilience and wear resistance as compared with the aforementioned butadiene series copolymers obtained by using the organolithium initiator, so that the improvement of these properties are strongly required.

SUMMARY OF THE INVENTION

It is, therefore, an object of the invention to solve the above problems of the conventional techniques and to provide conjugated diene series rubber compositions having an excellent processability at unvulcanized state and excellent rebound resilience, strengths at rupture, particularly high-temperature strength and wear resistance at vulcanized state.

According to the invention, there is the provision of a conjugated diene series rubber composition having an excellent high-temperature strength, comprising as a rubber component (a) 20~100% by weight of a conjugated diene polymer obtained by polymerizing a conjugated diene compound alone or a combination of a conjugated diene compound and an aromatic vinyl compound and bonding a polymer of a nitrogen-containing vinyl compound represented by the following general formula:

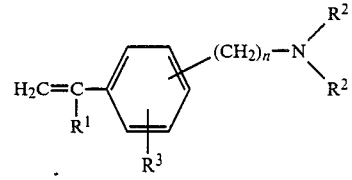

wherein $R^1$ and $R^3$ are a hydrogen atom or an alkyl group, $R^2$ is an alkyl group, a trialkylsilyl group or an allyl group and n is 0 or 1, with a polymerization degree of 2~200 to at least one end portion of molecular chain of the resulting polymer, and having a Mooney viscosity ($ML_{1+4}$, 100° C.) of 10~150 and (b) not more than 80% by weight of a diene polymer rubber except for the above copolymer (a).

DESCRIPTION OF THE PREFERRED EMBODIMENTS

Component (a) : Conjugated diene polymer

According to the invention, the conjugated diene series rubber composition contains the conjugated diene polymer (a) as an essential component which is constituted with a conjugated diene compound. As the conjugated diene compound, there are used conjugated diolefins such as butadiene, isoprene, pentadiene and so on. Preferably, butadiene is used as the conjugated diene compound. On the other hand, styrene, vinyltoluene, α-methylstyrene and so on are used as an aromatic vinyl compound copolymerizable with the conjugated diene compound, among which styrene is preferable.

Further, the content of conjugated diene in the conjugated diene polymer is preferable to be not less than 30% by weight from a viewpoint of the tensile strength.

Particularly, copolymers of aromatic vinyl compound-conjugated diene compound having a content of aromatic vinyl compound of not less than 3% by weight, preferably not less than 5% by weight are favorable because they are excellent in the processability at unvulcanized state and the rebound resilience, strengths at rupture and wear resistance at vulcanized state. In such a copolymer, the upper limit of the aromatic vinyl compound content is not particularly restricted, but it is not more than 50% by eight, preferably not more than 45% by weight, more particularly not more than 30% by weight.

Among the above copolymers, styrene-butadiene copolymer is preferable.

As an organoalkali metal series initiator used in the polymerization, mention may be made of sodium naphthalene, potassium naphthalene, n-butyl lithium, sec-butyl lithium, phenyl lithium, 1,4-dilithiobutane and so on, among which n-butyl lithium is preferable. The organoalkali metal series initiator is usually used in an amount of 0.01~20 parts by weight per 100 parts by weight of monomer.

As a hydrocarbon solvent used in the polymerization, mention may be made of pentane, hexane, heptane, cyclohexane, methylcyclohexane, benzene, toluene, xylene and a mixture thereof. The hydrocarbon solvent is used in an amount of 1~20 parts by weight per 1 part by weight of monomer.

The copolymerization reaction using the organoalkali metal series initiator is carried out at a polymerization temperature of 0°~120° C., preferably 20°~100° C. under isothermal or temperature rising condition.

In the above polymerization or copolymerization, ether, tertiary amine and potassium salt such as tetrahydrofuran, dimethoxybenzene, ethylene glycol dimethyl ether, ethylene qlycol diethyl ether, N,N,N',N'-tetramethylethylenediamine, potassium salt of isoamyl alcohol, potassium salt of butyl alcohol, potassium salt of dodecylbenzenesulfonic acid and so on may be added for the purpose of randomization or for adjusting a microstructure of butadiene portion.

When the conjugated diene polymer is branched, favorable processability and properties are obtained. Particularly, the processability and high-temperature strength are excellent as compared with those of the non-branched polymer. As a means for the production of branched polymer, there are a method of using a polyfunctional monomer such as divinylbenzene or the like as a copolymerizing ingredient, a method of using a coupling agent and so on. The latter method is generally preferable.

As the coupling agent, mention may be made of tin halides, tin compounds of organocarboxylic acids, silicon halides, isocyanate compounds and the like.

The tin halide includes tin tetrachloride, dibutyldichloro tin, triphenyl tin chloride and so on. The tin compounds of organocarboxylic acids include dibutyl dilauryl tin, butyl tristearyl tin, dimethyl distearyl tin and so on. The silicon halide includes silicon tetrachloride and so on. As the isocyanate compound, use may be made of phenyl isocyanate, 2,4-tolylene diisocyanate, 2,6-tolylene diisocyanate, diphenylmethane diisocyanate, naphthalene diisocyanate, tolidine diisocyanate, triphenylmethane triisocyanate, p-phenylene diisocyanate, tris(isocyanatephenyl)thiophosphate, xylene diisocyanate, benzene-1,2,4-triisocyanate, naphthalene-1,2,5,7-tetraisocyanate, naphthalene-1,3,7-triisocyanate, hexamethylene diisocyanate, methylcyclohexane diisocyanate, isophorone diisocyanate and so on. Among them, aromatic diisocyanate or aromatic triisocyanate or dimers and trimers of various aromatic isocyanate compounds as well as aromatic polyisocyanate compounds such as adducts obtained by reacting the aromatic isocyanate with polyol or polyamine and the like are preferably used.

The aromatic polyisocyanate compounds such as 2,4-tolylene diisocyanate, diphenylmethane diisocyanate, naphthalene diisocyanate and the like are particularly preferable.

The coupling is carried out at a temperature of 0°~120° C., preferably 20°~100° C. by adding the coupling agent in an amount of 0.01~1 equivalent to 1 mol of the organoalkali metal initiator.

On the other hand, when the polyfunctional monomer is used as a copolymerizing ingredient to produce a branched polymer, it is added to the conjugated diene compound in an amount of 0.01~1%.

According to the invention, a polymer using as a monomer a nitrogen-containing vinyl compound represented by the following general formula:

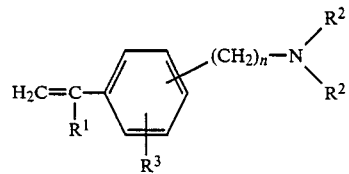

wherein $R^1$ and $R^3$ are a hydrogen atom or an alkyl group, $R^2$ is an alkyl group, a trialkylsilyl group or an allyl group and n is 0 or 1, is bonded to at least one end portion of molecular chain of the polymer composed of the conjugated diene compound or a combination of the conjugated diene compound and the aromatic vinyl compound. The nitrogen-containing vinyl compound includes, for example, aminostyrene, monoalkylstyrene, dialkylaminostyrenes such as p-dimethylaminostyrene, p-diethylaminostyrene, p-diisopropylaminostyrene, p-N,N-bis(trimethylsilyl)-aminostyrene, m-dimethylaminostyrene and m-diethylaminostyrene, and the like. Particularly, most preferable properties are obtained when n in the general formula is zero. The polymer of nitrogen-containing vinyl compound bonded to the end portion of molecular chain has a polymerization degree of 2~200, preferably 4~150, more particularly 6~50.

When the polymerization degree exceeds 200, resinous properties unfavorably appear to reduce the rebound resilience, while when it is less than 2, the sufficiently improving effect cannot be obtained. Since the ingredient having a cohesive force, i.e. the nitrogen-containing vinyl compound is introduced into the polymer, it is considered that the dispersion of filler and the high-temperature strength at rupture are improved by controlling the interaction between the polymer and the filler within a proper range.

The polymerization of the nitrogen-containing vinyl compound is generally carried out at a temperature of $-30°$ C.~20° C., preferably 0°~100° C. under a pressure of atmospheric pressure to 10 atm, preferably atmospheric pressure to 5 atm for about 0.1~5 hours subsequent to the previously mentioned polymerization or copolymerization.

According to the invention, the resulting conjugated diene polymer has a Mooney viscosity ($ML_{1+4}$, 100° C.) of 10~150, preferably 20~120 as a measure of molecular weight. When the Mooney viscosity is less than 10, the processability at unvulcanized state is good but the rebound resilience and tensile strength at vulcanized state lower, while when it exceeds 150, the processability at unvulcanized state is poor and hence the properties of the vulcanizate are not improved.

Moreover, when the conjugated diene compound is butadiene, the content of vinyl bond in butadiene portion is not particularly restricted, but it is preferably not less than 16% by weight but not more than 70% by weight from viewpoints of production and effect.

When the conjugated diene polymer is styrene-butadiene copolymer, if the content of vinyl bond is not less than 16% by weight, good properties such as rebound resilience and the like are obtained. That is, if the content of vinyl bond is less than 16% by weight, the random copolymerization of styrene is difficult in the batch polymerization system, while in case of the continuous polymerization system, random styrene-butadiene copolymer is obtained but a large amount of low molecular weight ingredients are contained therein, so that the rebound resilience is undesirably poor.

The branched degree of the resulting conjugated diene polymer is measured by means of GPC and particularly calculated by a ratio (increment) of high molecular weight ingredient. In the conjugated diene polymer according to the invention, it is desirable that the ratio of branched polymer is not less than 15%, particularly 20~70%.

The conjugated diene polymer produced according to the invention is provided at its end portion of molecular chain with a block polymer of the nitrogen-containing vinyl compound such as aromatic vinyl amine compound or the like having a polymerization degree of 2~200, so that it provides a conjugated rubber composition having an excellent processability at unvulcanized state and excellent rebound resilience, strengths at rupture, particularly high-temperature strength and wear resistance at vulcanized state.

Component (b): Diene polymer rubber

The conjugated diene series composition according to the invention comprises 20~100% by weight of the aforementioned conjugated diene polymer (a) as an essential component, and further contains not more than 80% by weight, preferably 20~70% by weight, more particularly 25~50% by weight of at least one diene polymer rubber (b) selected from natural rubber, high-cis polyisoprene rubber, emulsion-polymerized styrene-butadiene copolymer rubber, solution-polymerized styrene-butadiene copolymer rubber having a bound styrene content of 10~40% by weight and a vinyl content of 10 80% by weight, high-cis polybutadiene rubber obtained using a catalyst system of nickel, cobalt, titanium and neodymium, ethylene-propylene-diene terpolymer rubber, halogenated butyl rubber and halogenated ethylene-propylene-diene terpolymer rubber.

In the conjugated diene series rubber composition according to the invention, it is preferable to blend the conjugated diene polymer (a) with natural rubber. In this case, the blending amount of natural rubber is 20~70% by weight, preferably 25~50% by weight from a viewpoint of a balance among processability, tensile strength and rebound resilience.

Furthermore, the conjugated diene series rubber composition according to the invention may contain 20~80 parts by weight of a filler such as carbon black (HAF, ISAF, FEF, GPF, SAF or the like) per 100 parts by weight of the rubber component, 0.1~5 parts by weight of a vulcanizing agent and, if necessary, an oil extended rubber, an oil extender such as aromatic process oil, naphthenic process oil or the like and various additives for rubber.

The conjugated diene series rubber composition according to the invention can be used in tread, undertread, sidewall, bead portions and so on for tires as well as other industrial goods such as rubber vibration isolator, hose, belt and the like through vulcanization.

The following examples are given in the illustration of the invention and are not intended as limitations thereof. Unless otherwise specified, part and percentage are by weight.

In the examples, various properties were evaluated according to the following methods.

The microstructure of diene portion (content of vinyl bond) was measured by an infrared spectroscopy (Morero's method).

The bound styrene content was measured from a predetermined calibration curve by an infrared spectroscopy based on an absorption of phenyl group at 690 cm$^{-1}$.

The Mooney viscosity (ML$_1$+4, 100° C.) was measured at a temperature of 100° C. for 4 minutes after the preheating for 1 minute.

The strength at rupture was evaluated as a tensile strength according to a method of JIS K-6301.

The high-temperature strength was evaluated as a tensile strength at 100° C. according to a method of JIS K-6301.

The rebound resilience was measured at 50° C. by means of a Dunlop tripsometer.

The wear resistance was measured by means of a Pico abrasion testing machine.

The processability was evaluated at 10 stages on roll retention property and extrusion processability (shape, speed) of kneaded mass (The larger the numerical value, the better the processability).

EXAMPLE 1

Production of conjuqated diene polymer (a)

Into an autoclave of 5 l capacity were charged 200 g of cyclohexane, 125 g of styrene, 375 g of 1,3-butadiene and 10 g of tetrahydrofuran. The resulting mixture was adjusted to a temperature of 20° C. and added with 4.4 mmol of n-butyl lithium, which was polymerized for 60 minutes while temperature rising. After the conversion ratio reached 100%, the temperature in the autoclave was lowered to 20° C., and 200 mmol (29 g) of p-dimethylaminostyrene was added to conduct further reaction for 30 minutes. The polymerization degree of p-dimethylaminostyrene calculated from the amounts of n-butyl lithium and dimethylaminostyrene was 50.

Preparation of conjuqated diene series rubber composition

The resulting conjugated diene polymer (a) was kneaded with the diene polymer rubber (b) at a composition ratio shown in Table 1 according to the following compounding recipe to obtain an unvulcanized rubber composition, which was then vulcanized at 145° C. for 30 minutes. The processability of the unvulcanized composition and the properties of the vulcanizate were measured to obtain results as shown in Table 1.

| Compounding recipe | |
| --- | --- |
| | (part) |
| Polymer | 100 |
| Carbon black HAF | 50 |
| Stearic acid | 2 |
| Zinc white | 3 |
| Antioxidant 810NA *1 | 1 |
| Antioxidant CZ *2 | 0.6 |
| Antioxidant M *3 | 0.6 |
| Antioxidant D *4 | 0.4 |
| Sulfur | 1.5 |

Note
*1: N'—phenyl-N—isopropyl-p-phenylenediamine
*2: N—cyclohexyl-2-benzothiazolylsulfeneamide
*3: 2-mercaptobenzothiazole
*4: 1,3-diphenylguanidiene

EXAMPLE 2

Production of conjugated diene polymer (a)

Into an autoclave of 5 capacity were charged 2,000 g of cyclohexane, 125 g of styrene, 365 g of 1,3-butadiene, 0.5 g of divinylbenzene and 10 g of tetrahydrofuran, and 4.4 mmol of n-butyl lithium was added hereto. Then, the polymerization under temperature rising was carried out in the same manner as described in Example 1. After the conversion ratio reached 100%, 220 mmol (35 g) of p-dimethylaminomethylstyrene was added to conduct the reaction for 30 minutes.

Preparation of conjugated diene series rubber composition

A conjugated diene series rubber composition was prepared by using the resulting conjugated diene polymer (a) in the same manner as described in Example 1.

The processability of the resulting unvulcanized composition and the properties of the vulcanizate formed therefrom are shown in Table 1.

EXAMPLE 3

Production of conjugated diene polymer (a)

Into an autoclave of 5 l capacity were charged 2,000 g of cyclohexane, 125 g of styrene, 0.5 g of divinylbenzene, 375 g of 1,3-butadiene and 10 g of tetrahydrofuran and then 4.4 mmol of n-butyl lithium was added thereto. After the polymerization under temperature rising was carried out to obtain a conversion ratio of 100%, 220 mmol (32 g) of p-dimethylaminostyrene was added to conduct the reaction for 30 minutes.

Preparation of conjuqated diene series rubber composition

A conjugated diene series rubber composition was prepared by using the above conjugated diene polymer (a) in the same manner as described in Example 1.

The processability of the resulting unvulcanized composition and the properties of the vulcanizate formed therefrom are shown in Table 1.

EXAMPLE 4

Production of conjuqated diene polymer (a)

Into an autoclave of 5 l capacity were charged 2,000 g of cyclohexane, 125 g of styrene, 375 g of 1,3- butadiene and 10 g of tetrahydrofuran and then 5.0 mmol of n-butyl lithium was added thereto. After the polymerization under temperature rising was carried out to obtain a conversion ratio of 100%, the temperature of the autoclave was lowered to 20° C. and 250 mmol (37 g) of p-dimethylaminostyrene was added to conduct the reaction. Further, 1.25 g of diphenylmethane diisocyanate was added to conduct the coupling reaction.

Preparation of conjuqated diene series rubber composition

A conjugated diene series rubber composition was prepared by using the above conjugated diene polymer (a) in the same manner as described in Example 1.

The processability of the resulting unvulcanized composition and the properties of the vulcanizate formed therefrom are shown in Table 1.

EXAMPLE 5

Production of conjugated diene polymer (a)

Into an autoclave of 5 l capacity were charged 2,000 g of cyclohexane, 125 g of styrene, 375 g of 1,3-butadiene and 10 g of tetrahydrofuran and then 5.0 mmol of n-butyl lithium was added thereto. After the polymerization under temperature rising was carried out to obtain a conversion ratio of 100%, 250 mmol (40 g) of p-dimethylaminomethylstyrene was added to conduct the reaction. Furthermore, 0.32 g of tin tetrachloride was added to conduct the coupling reaction Preparation of conjugated diene series rubber composition A conjugated diene series rubber composition was prepared by using the above conjugated diene polymer (a) in the same manner as described in Example 1.

The processability of the resulting unvulcanized composition and the properties of the vulcanizate formed therefrom are shown in Table 1.

EXAMPLE 6

A conjugated diene series rubber composition was prepared by using only the conjugated diene polymer (a) produced in Example 4 in the same manner as described in Example 1. The measured results are shown in Table 1.

EXAMPLE 7

A conjugated diene series rubber composition was prepared by using the conjugated diene polymer (a) produced in Example 4 in the same manner as described in Example 1. The measured results are shown in Table 1.

EXAMPLE 8

Production of conjugated diene polymer (a)

Into an autoclave of 5 l capacity were charged 2,000 g of cyclohexane, 500 g of 1,3-butadiene and 10 g of tetrahydrofuran. After the temperature of the resulting mixture was adjusted to 20° C., 5.0 mmol of n-butyl lithium was added to conduct the polymerization under temperature rising for 60 minutes. After the conversion ratio reached 100%, the temperature in the autoclave was lowered to 20° C., and then 250 mmol (37 g) of p-dimethylaminostyrene and further 1.25 g of diphenylmethane diisocyanate were added to conduct the coupling reaction.

Preparation of conjuqated diene series rubber composition

A conjugated diene series rubber composition was prepared by using the above conjugated diene polymer (a) in the same manner as described in Example 1.

The processability of the resulting unvulcanized composition and the properties of the vulcanizate formed therefrom are shown in Table 1.

EXAMPLE 9

Production of conjugated diene polymer (a)

Into an autoclave of 5 l capacity were charged 2,000 g of cyclohexane, 450 g of 1,3-butadiene, 50 g of styrene and 10 g of tetrahydrofuran. After the temperature was adjusted to 20° C., 4.4 mmol of n-butyl lithium was added to conduct the polymerization under temperature rising for 60 minutes. After the conversion ratio reached 100%, the temperature in the autoclave was lowered to 20° C., and then 250 mmol (37 g) of p-dimethylaminostyrene and further 1.25 g of diphenylmethane diisocyanate were added to conduct the coupling reaction.

Preparation of conjuqated diene series rubber composition

A conjugated diene series rubber composition was prepared by using the above conjugated diene polymer (a) in the same manner as described in Example 1.

The processability of the resulting unvulcanized composition and the properties of the vulcanizate formed therefrom are shown in Table 1.

EXAMPLE 10

Production of conjuqated diene polymer (a)

A conjugated diene polymer (a) was produced in the same manner as described in Example 1 except that isoprene was used instead of butadiene.

Preparation of conjugated diene series rubber composition

A conjugated diene series rubber composition was prepared by using the above conjugated diene polymer (a) in the same manner as described in Example 1.

The processability of the resulting unvulcanized composition and the properties of the vulcanizate formed therefrom are shown in Table 1.

EXAMPLE 11

Production of conjugated diene polymer (a)

After styrene and butadiene were copolymerized in the same manner as described in Example 1, 44 mmol of dimethylaminostyrene was further added at 20° C. to conduct the polymerization.

Preparation of conjugated diene series rubber composition

A conjugated diene series rubber composition was prepared by using the above conjugated diene polymer (a) in the same manner as described in Example 1. The measured results are shown in Table 1.

EXAMPLE 12

Production of conjugated diene polymer (a)

After styrene and butadiene were copolymerized in the same manner as described in Example 1, 660 mmol of p-dimethylaminostyrene was further added at 20° C. to conduct the polymerization.

Preparation of conjugated diene series rubber composition

A conjugated diene series rubber composition was prepared by using the above conjugated diene polymer (a) in the same manner as described in Example 1.

The processability of the resulting unvulcanized composition and the properties of the vulcanizate formed therefrom are shown in Table 1.

EXAMPLE 13

Production of conjuqated diene polymer (a)

Into a reactor of 20 l capacity provided with a stirrer and a jacket were continuously charged 15 g/min of butadiene containing 30 ppm of 1,2-butadiene and 5 g/min of styrene as a monomer, 0.7 g/min of tetrahydrofuran, 140 g/min of cyclohexane, and 0.065 g of n-butyl lithium as a polymerization initiator per 100 g of the monomer through pumps, during which the temperature of the reactor was controlled to 70° C. The conversion ratio was more than 98% at the outlet of the reactor. At an inlet of a second reactor was newly added p-dimethylaminostyrene in an amount of 50 mol per 1 mol of n-butyl lithium to conduct further polymerization at 70° C. At an outlet of the second reactor was added diphenylmethane diisocyanate in an equimolar amount to n-butyl lithium to thereby conduct the coupling reaction.

Preparation of conjugated diene series rubber composition

A conjugated diene series rubber composition was prepared by using the above conjugated diene polymer (a) in the same manner as described in Example 1. The measured results are shown in Table 1.

COMPARATIVE EXAMPLE 1

Production of conjugated diene polymer (a)

Into an autoclave of 5 l capacity were charged 2,000 g of cyclohexane, 125 g of styrene, 375 g of 1,3-butadiene and 10 g of tetrahydrofuran, and then 4.4 mmol of n-butyl lithium was added to conduct the polymerization under temperature rising. After the conversion ratio reached 100%, the autoclave was cooled to 20° C., and then 4.4 mmol (0.65 g) of p-dimethylaminostyrene was added to conduct low polymerization reaction. Further, 1.1 g of diphenylmethane diisocyanate was added to conduct the coupling reaction.

Preparation of conjuqated diene series rubber composition

A conjugated diene series rubber composition was prepared by using the above conjugated diene polymer (a) in the same manner as described in Example 1.

The processability of the resulting unvulcanized composition and the properties of the vulcanizate formed therefrom are shown in Table 1.

COMPARATIVE EXAMPLE 2

Production of conjuqated diene polymer (a)

Into an autoclave of 5 l capacity were charged 2,000 g of cyclohexane, 125 g of styrene, 375 g of 1,3-butadiene and 10 g of tetrahydrofuran, and then 50 mmol of n-butyl lithium was added to conduct the polymerization under temperature rising. After the completion of polymerization, 0.25 g of tin tetrachloride was added to conduct the coupling reaction.

The resulting polymer solution was added with 2 g of 2,6-di-tert-butyl-p-cresol, subjected to steam stripping for the removal of solvent and dried through a roll heated to 100° C.

Preparation of conjuqated diene series rubber composition

A conjugated diene series rubber composition was prepared by using the above conjugated diene polymer (a) in the same manner as described in Example 1.

The processability of the resulting unvulcanized composition and the properties of the vulcanizate formed therefrom are shown in Table 1.

COMPARITIVE EXAMPLE 3

A commercially available emulsion-polymerized styrene-butadiene copolymer rubber (made by Japan Synthetic Rubber Co., Ltd.) was used to evaluate the processability of unvulcanized composition and the properties of the vulcanizate formed therefrom as shown in Table 1.

EXAMPLE 14

Production of conjugated diene polymer (a)

Into an autoclave of 5 l capacity were charged 2,000 g of cyclohexane, 125 g of styrene, 375 g of 1,3-butadiene and 10 g of tetrahydrofuran, and the resulting mixture was adjusted to a temperature of 20° C., and then 5.0 mmol of n-butyl lithium was added to conduct the polymerization under temperature rising for 60 minutes. After the conversion ratio reached 100%, 250 mmol (65 g) of p-N,N-bis(trimethylsilyl)-aminostyrene was added to conduct further reaction for 30 minutes. Furthermore, 1.25 g of diphenylmethane diisocyanate was added to conduct the coupling reaction.

The resulting polymer was subjected to desolvation and hydrolysis for trimethylsilyl group to obtain a polymer containing a primary aromatic amino group in the terminal of the polymer.

Preparation of conjuqated diene series rubber composition

A conjugated diene series rubber composition was prepared by using the above conjugated diene polymer (a) in the same manner as described in Example 1. The measured results are shown in Table 1.

COMPARATIVE EXAMPLE 4

Production of conjuqated diene polymer (a)

Into an autoclave of 5 l capacity were charged 2,000 g of cyclohexane, 125 g of styrene, 375 g of 1,3-butadiene and 10 g of tetrahydrofuran, and the resulting mixture was adjusted to a temperature of 20° C., and then 44 mmol of n-butyl lithium was added to conduct the polymerization under temperature rising for 60 minutes After the conversion ratio reached 100%, the temperature in the autoclave was lowered to 20° C., and then 986 mmol (101 g) of p-dimethylaminostyrene was added to conduct further polymerization for 30 minutes.

Preparation of conjuqated diene series rubber composition

A conjugated diene series rubber composition was prepared by using the above conjugated diene polymer (a) in the same manner as described in Example 1. The measured results are shown in Table 1.

COMPARATIVE EXAMPLE 5

Production of conjuqated diene polymer (a)

Into an autoclave of 5 l capacity were charged 2,000 g of cyclohexane, 125 g of styrene, 375 g of 1,3-butadiene and 10 g of tetrahydrofuran, and the resulting mixture was adjusted to a temperature of 20° C., and then 10 mmol of n-butyl lithium was added to conduct the polymerization under temperature rising. After the conversion ratio reached 100%, the temperature in the autoclave was lowered to 20° C., and then 500 mmol (53 g) of p-dimethylaminostyrene was added to conduct the polymerization for 30 minutes.

Preparation of conjuqated diene series rubber composition

A conjugated diene series rubber composition was prepared by using the above conjugated diene polymer (a) in the same manner as described in Example 1. The measured results are shown in Table 1.

EXAMPLE 15

A conjugated diene series rubber composition was prepared by using the conjugated diene polymer (a) produced in Example 4 in the same manner as described in Example 1. The measured results are shown in Table 1.

COMPARATIVE EXAMPLE 6

A conjugated diene series rubber composition was prepared by using the conjugated diene polymer (a) produced in Example 1 in the same manner as described in Example 1. The measured results are shown in Table 1.

COMPARATIVE EXAMPLE 7

A rubber composition was prepared by using 30 parts by weight of natural rubber and 70 parts by weight of polybutadiene rubber as a rubber component in the same manner as described in Example 1. The measured results are shown in Table 1.

TABLE 1

| | Conjugated diene polymer (a) | | | | | | |
|---|---|---|---|---|---|---|---|
| | styrene content (%) | vinyl content (%) | Mooney viscosity | polyfunctional monomer | nitrogen-containing vinyl compound | polymerization degree | coupling agent |
| Example 1 | 24.0 | 51 | 43 | — | dimethylamino styrene | 50 | — |
| Example 2 | 23.5 | 50 | 55 | divinyl benzene | p-dimethylaminomethylstyrene | 50 | — |
| Example 3 | 23.5 | 50 | 60 | — | p-dimethylaminomethylstyrene | 50 | — |
| Example 4 | 23.5 | 49 | 65 | — | dimethylaminostyrene | 50 | diphenylmethane diisocyanate |
| Example 5 | 23.0 | 52 | 62 | — | p-dimethylaminomethylstyrene | 50 | tin tetrachloride |
| Example 6 | 23.5 | 49 | 65 | — | dimethylaminostyrene | 50 | diphenylmethane diisocyanate |
| Example 7 | 23.5 | 49 | 65 | — | dimethylaminostyrene | 50 | diphenylmethane diisocyanate |
| Example 8 | 0 | 54 | 47 | — | dimethylaminostyrene | 50 | diphenylmethane diisocyanate |
| Example 9 | 10.0 | 52 | 52 | — | dimethylaminostyrene | 50 | diphenylmethane diisocyanate |
| Example 10 | 24.0 | 35 | 40 | — | dimethylaminostyrene | 50 | — |
| Example 11 | 24.0 | 51 | 38 | — | dimethylaminostyrene | 10 | — |
| Example 12 | 24.0 | 51 | 73 | — | dimethylaminostyrene | 150 | — |
| Example 13 | 23.5 | 50 | 45 | — | dimethylaminostyrene | 50 | diphenylmethane diisocyanate |
| Example 14 | 23.0 | 50 | 51 | — | p-N,N—bis(trimethylsilyl)-aminostyrene | 50 | diphenylmethane diisocyanate |
| Example 15 | 23.5 | 49 | 65 | — | dimethylaminostyrene | 50 | diphenylmethane diisocyanate |
| Comparative Example 1 | 25.0 | 51 | 43 | — | dimethylaminostyrene | 1 | diphenylmethane diisocyanate |
| Comparative | 25.0 | 50 | 75 | — | — | — | tin tetrachloride |

TABLE 1-continued

| | Diene series polymer rubber (a) | | | | | | | |
|---|---|---|---|---|---|---|---|---|
| Example 2 | | | | | | | | |
| Comparative Example 3 | — | — | — | — | — | — | — | — |
| Comparative Example 4 | 21.0 | 50 | 135 | — | dimethylaminostyrene | | 220 | — |
| Comparative Example 5 | 23.0 | 50 | 8 | — | dimethylaminostyrene | | 50 | — |
| Comparative Example 6 | 23.5 | 49 | 65 | — | dimethylaminostyrene | | 50 | diphenylmethane diisocyanate |
| Comparative Example 7 | — | — | — | — | — | | — | — |

| | Compounding ratio in rubber composition (part) | | | Properties of rubber composition | | | | | |
|---|---|---|---|---|---|---|---|---|---|
| | Diene series polymer rubber (a) | Diene series polymer rubber (b) natural rubber | BR *5 | Elongation (%) | Tensile strength (kgf/cm²) room temperature | 100° C. | Rebound resilience (%, 50° C.) | Wear resistance (Pico wear) | Processability |
| Example 1 | 70 | 30 | — | 420 | 265 | 170 | 72 | 115 | 8 |
| Example 2 | 70 | 30 | — | 425 | 275 | 180 | 73 | 130 | 9 |
| Example 3 | 70 | 30 | — | 420 | 273 | 185 | 73 | 125 | 9 |
| Example 4 | 70 | 30 | — | 425 | 285 | 195 | 75 | 130 | 10 |
| Example 5 | 70 | 30 | — | 420 | 260 | 190 | 72 | 115 | 8 |
| Example 6 | 100 | — | — | 420 | 265 | 205 | 73 | 120 | 8 |
| Example 7 | 70 | 10 | 20 | 400 | 255 | 200 | 73 | 135 | 8 |
| Example 8 | 70 | 30 | — | 390 | 235 | 195 | 75 | 135 | 7 |
| Example 9 | 70 | 30 | — | 400 | 250 | 205 | 75 | 135 | 8 |
| Example 10 | 70 | 30 | — | 400 | 240 | 180 | 72 | 115 | 8 |
| Example 11 | 70 | 30 | — | 390 | 265 | 175 | 72 | 120 | 9 |
| Example 12 | 70 | 30 | — | 410 | 270 | 190 | 74 | 120 | 7 |
| Example 13 | 70 | 30 | — | 420 | 270 | 200 | 72 | 120 | 10 |
| Example 14 | 70 | 30 | — | 430 | 295 | 215 | 76 | 125 | 10 |
| Example 15 | 50 | 50 | — | 450 | 295 | 220 | 72 | 125 | 10 |
| Comparative Example 1 | 70 | 30 | — | 405 | 260 | 165 | 70 | 110 | 7 |
| Comparative Example 2 | 70 | 30 | — | 410 | 265 | 160 | 71 | 115 | 6 |
| Comparative Example 3 | SBR *6 100 | — | — | 410 | 265 | 145 | 66 | 100 | 9 |
| Comparative Example 4 | 70 | 30 | — | 370 | 255 | 170 | 68 | 105 | 5 |
| Comparative Example 5 | 70 | 30 | — | 440 | 250 | 140 | 71 | 70 | 10 |
| Comparative Example 6 | 15 | 45 | 40 | 460 | 300 | 155 | 69 | 80 | 10 |
| Comparative Example 7 | — | 30 | 70 | 430 | 220 | 125 | 70 | 135 | 6 |

*5: butadiene rubber, BR01 made by Japan Synthetic Rubber Co., Ltd.
*6: styrene-butadiene rubber, SBR #1500 made by Japan Synthetic Rubber Co., Ltd.

The conjugated diene series rubber compositions according to the invention are excellent in the processability at unvulcanized state and the rebound resilience, strengths at rupture, particularly high-temperature strength and wear resistance at vulcanized state, so that they can be used for tire articles such as tread, undertread, sidewall, bead portion and the like as well as other industrial goods such as rubber vibration isolator, hose, belt, and so on through vulcanization after the addition of ordinary additives for rubber.

What is claimed is:

1. A conjugated diene series rubber composition having an excellent high-temperature strength, comprising as a rubber component (a) 20~100% by weight of a conjugated diene polymer obtained by polymerizing a conjugated diene compound alone or a combination of a conjugated diene compound and an aromatic vinyl compound and bonding polymer a nitrogen-containing vinyl compound represented by the following general formula:

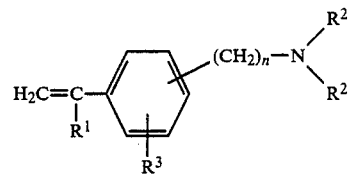

wherein $R^1$ and $R^3$ are a hydrogen atom or an alkyl group, $R^2$ is an alkyl group, a trialkylsilyl group or an allyl group and n is 0 or 1, with a polymerization degree of 2~200 to at least one end portion of molecular chain of the resulting polymer, and having a Mooney viscosity ($ML_{1+4}$, 100° C.) of 10~150, and (b) not more than 80% by weight of a diene polymer rubber other than above polymer (a).

2. The rubber composition according to claim 1, wherein said conjugated diene compound is butadiene and said aromatic vinyl compound is styrene.

3. The rubber composition according to claim 1, wherein said conjugated diene polymer (a) is produced by polymerizing said conjugated diene compound alone or the combination of said conjugated diene compound and said aromatic vinyl compound, bonding said nitrogen-containing vinyl compound with a polymerization degree of 2–200 to at least one end portion of the molecular chain of the resulting polymer and then coupling with a polyfunctional coupling agent.

4. The rubber composition according to claim 1, wherein said conjugated diene polymer (a) has a content of conjugated diene of not less than 30% by weight and a content of aromatic vinyl compound of not less than 3% by weight.

5. The rubber composition according to claim 1, wherein said polymerization degree is 4 150.

6. The rubber composition according to claim 1, wherein said Mooney viscosity is 20 120.

7. The rubber composition according to claim 1, wherein said diene polymer rubber (b) is selected from the group consisting of natural rubber, high-cis polyisoprene rubber, emulsion-polymerized styrene-butadiene copolymer rubber, solution-polymerized styrene-butadiene copolymer rubber, high-cis polybutadiene rubber, ethylene-propylene-diene terpolymer rubber, halogenated butyl rubber, and halogenated ethylene-propylene-diene terpolymer rubber.

8. The rubber composition according to claim 1, wherein said nitrogen-containing vinyl compound has the following general formula:

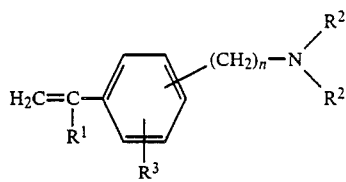

wherein $R^1$ and $R^3$ are a hydrogen atom or an alkyl group and $R^2$ is an alkyl group, a trialkylsilyl group or an allyl group.

* * * * *